United States Patent [19]
DeWachter et al.

[11] Patent Number: 5,462,381
[45] Date of Patent: Oct. 31, 1995

[54] CORROSION RESISTANT BUSHING

[75] Inventors: Gary DeWachter; John K. Newton, both of Greenville, S.C.

[73] Assignee: Reliance Electric Industrial Company, Greenville, S.C.

[21] Appl. No.: 340,544

[22] Filed: Nov. 16, 1994

Related U.S. Application Data

[63] Continuation of Ser. No. 104,987, Aug. 10, 1993, abandoned, which is a continuation of Ser. No. 890,367, May 26, 1992, abandoned, which is a continuation of Ser. No. 512,657, Apr. 20, 1990, abandoned.

[51] Int. Cl.$^6$ .................................................. F16B 2/00
[52] U.S. Cl. .......................... 403/365; 403/334; 403/371; 403/404; 384/300
[58] Field of Search ...................... 403/365, 334, 403/337, 370, 371, 40, 404; 384/296, 300, 908

[56] References Cited

U.S. PATENT DOCUMENTS

| | | |
|---|---|---|
| 2,952,486 | 9/1960 | Reuter et al. . |
| 3,076,668 | 2/1963 | Famely . |
| 3,224,821 | 12/1965 | Barr . |
| 3,389,749 | 6/1968 | Towns et al. . |
| 3,582,166 | 6/1971 | Reising . |
| 3,594,049 | 7/1971 | Turner . |
| 3,909,087 | 9/1975 | Cairns . |
| 3,929,396 | 12/1975 | Orkin et al. . |
| 3,931,748 | 1/1976 | Tertinek et al. . |
| 3,932,008 | 1/1976 | McCloskey et al. . |
| 3,936,099 | 2/1976 | Braun et al. . |
| 3,957,319 | 5/1976 | Gorski . |
| 3,986,993 | 10/1976 | Vassiliou . |
| 3,989,323 | 11/1976 | Lambert . |
| 4,031,286 | 6/1977 | Seymus . |
| 4,094,559 | 6/1978 | Slusarski . |
| 4,104,225 | 8/1978 | Conbere . |
| 4,118,537 | 10/1978 | Vary et al. . |
| 4,137,618 | 2/1979 | Krauss . |
| 4,199,199 | 4/1980 | Granda . |
| 4,252,859 | 2/1981 | Concannon et al. . |
| 4,277,118 | 7/1981 | McClosky . |
| 4,277,200 | 7/1981 | Speakman . |
| 4,374,874 | 2/1983 | Blitstein et al. . |
| 4,396,310 | 8/2983 | Mullenberg . |
| 4,452,547 | 6/1984 | Thiel et al. . |
| 4,554,704 | 11/1985 | Raffaeli . |
| 4,557,621 | 12/1985 | Mullenberg . |
| 4,584,893 | 4/1986 | Harding . |
| 4,623,087 | 11/1986 | Conolly . |
| 4,626,114 | 12/1986 | Phillips . |
| 4,645,440 | 2/1987 | Murata et al. . |
| 4,749,300 | 6/1988 | Berger et al. . |
| 4,840,395 | 6/1989 | Sturmon . |

FOREIGN PATENT DOCUMENTS

| | | |
|---|---|---|
| 1005769 | 2/1977 | Canada . |
| 1599452 | 8/1970 | France . |
| 58985 | 1/1970 | Poland . |
| 731348 | 6/1955 | United Kingdom . |
| 757382 | 9/1956 | United Kingdom . |

OTHER PUBLICATIONS

Marks Standard Handbook for Mechanical Engineers, 8th Edition, pp. 6–151, McGraw–Hill, 1978.
DuPont Teflon/Silverstone, TC214–84.
DuPont Teflon Industrial Coatings, TI–34–85.

*Primary Examiner*—Randolph A. Reese
*Assistant Examiner*—Harry C. Kim
*Attorney, Agent, or Firm*—Dority & Manning

[57] ABSTRACT

A novel bushing for use with industrial equipment such as a gear box is disclosed as being particularly adapted for long time usage in an adverse corrosive environment, such as salt water. The bushing is coated on all exposed surfaces with a fluorocarbon poller which is tough, resilient and is unaffected by the harsh environment. Preferably, the fluorocarbon is a polytetrafluoroethylene, and if applied as a first layer directly to the metal bushing, also includes a thermoset binder material such as a phenolic. Top or outer coatings may also be applied and such coatings do not contain a binder. A mechanical advantage is provided for assembly and disassembly as well as protection for the element.

15 Claims, 2 Drawing Sheets

CORROSION RESISTANT BUSHING

This is a continuation, of Ser. No. 08/104,987, filed Aug. 10, 1993, which is a continuation of Ser. No. 07/890,367, filed May 26, 1992, which is a continuation of Ser. No. 07/512,657, filed Apr. 20, 1990, all abandoned.

BACKGROUND OF THE INVENTION

This invention relates to bushings, particularly to a coupling bushing for use with gear box structures and the like which are coated with corrosion resistant material for permitting use of the bushing within a corrosive environment, particularly a salt water environment.

Conventional industrial equipment employing coupling bushings are generally devised as heavy duty tools, particularly constructed to withstand long-time usage under extreme power requirements and under adverse conditions. However, it has been found that the life span for a bushing in a salt water or other harsh environment is reduced considerably from many years to only a few weeks before corrosion deteriorates the bushing beyond further useful service. The materials utilized in conventional gear boxes and bushings associated therewith by way of example are generally made of ductile iron, cast iron, powdered metal (sintered steel) or steel and, in special applications, stainless steel in order to ensure long life usage. Since ductile iron, cast iron, powdered metal and steel offer little or no protection, eventually stainless steel was substituted therefor to obviate this problem for equipment intended for use in a harsh environment. However, even stainless steel is not able to survive salt water environment, and at best, may only prolong the life of the bushing.

A corrosive environment particularly affects the operative connection between the output shaft of a gear box and its associated bushings which must be necessarily disconnected from the host shaft when a driving or driven mechanism to which the gear box is connected is disassembled. Even slight corrosion between the bushing and output shaft results in difficulty if not an impossibility to disengage their operative connection.

Therefore, it is a principal object of the present invention to enhance the life span of coupling bushings for use with gear boxes and other industrial equipment under adverse corrosive environments such as those involving salt water, fertilizers, concrete, sewage disposal, and chemical processes.

Another object of the present invention is to improve the art of coupling bushings by permitting the use of standard materials susceptible to corrosion in the construction of the same and yet extend the life span for these devices.

These and other objects of the present invention are achieved by the present invention which is directed to the application to bushing surfaces of a corrosion resistant material, particularly a coating of a fluorocarbon polymer such as a polytetrafluoroethylene polymer. When, however, a fluorocarbon polymer is applied directly to the bushing surfaces, a thermosettable binder material should also be employed to effectuate proper adherence of the coating to the metal. When plural coating layers are employed, top or overcoat layers of the polymer do not include such a binder material and adhere under a proper temperature-time exposure to the base or prime coating. Thicknesses of the coatings have been particularly adapted for this part of the assembly. The thickness is devised in accordance with acceptable tolerances associated with details of the bushing in order to avoid any binding during engagement or disengagement of the bushing from a hub shaft for the gear box and the prevention of inadvertent wear of the material from these parts, and as pointed hereinafter, coatings according to the present invention afford better seating and removal characteristics.

These and other objects of the present invention will become apparent when reading the following specification taken in conjunction with the accompanying drawings, wherein.

DESCRIPTION OF THE PREFERRED EMBODIMENT

Figure 1:
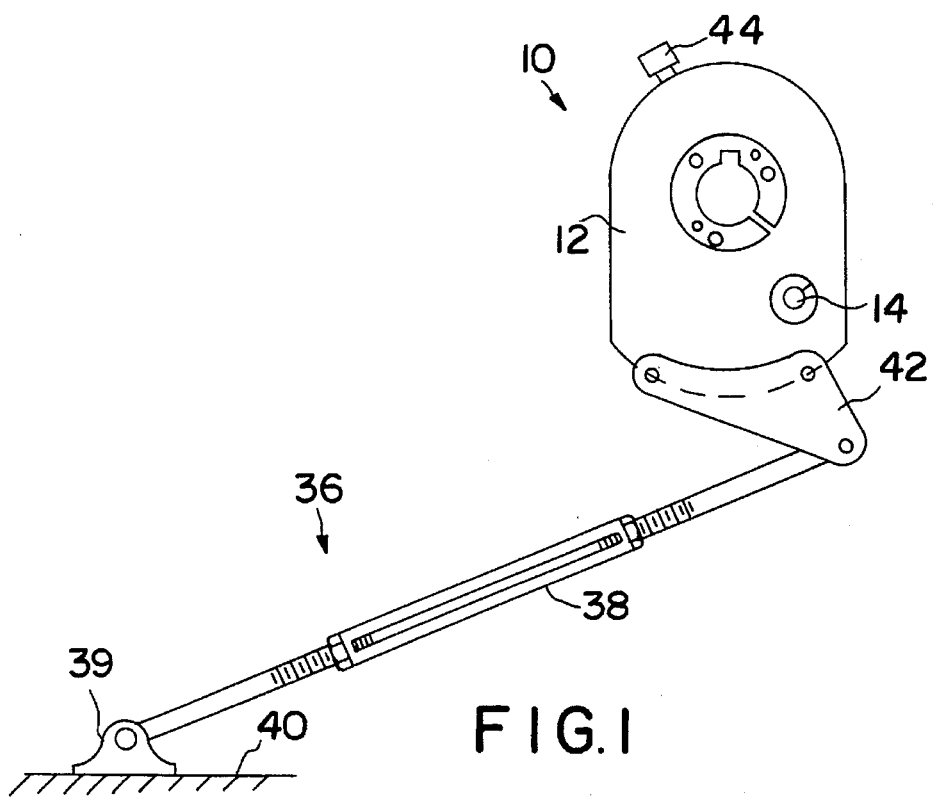
FIG. 1 is an elevational view of a speed reduction device in the form of a gear box showing the device combined with a torque arm assembly.
Figure 2:
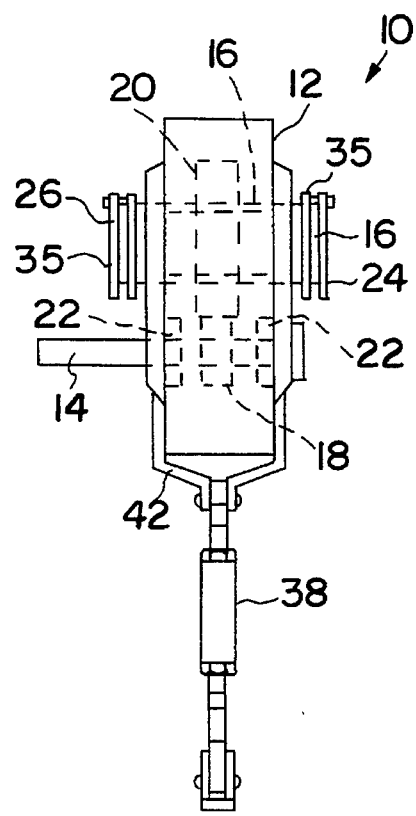
FIG. 2 is a side view of the device illustrated in FIG. 1.

As shown in FIGS. 1 and 2, a typical gear reduction device, for example, a reducer, is indicated generally by the reference numeral 10 as illustrative of equipment with which bushings according to the present invention may be employed. Gear box 10 includes, inter alia, a housing 12, an input shaft 14 and an output hub 16.

The input shaft 14 is formed with a pinion 18 integral therewith within the housing 12 and being in operative engagement with a output gear 20 enmeshed therewith. Suitable sealing devices 22, such as double-lipped seals, or the like, surround the shaft 14 within the housing 12 for sealing against the influx of outside material into the housing.

Figure 3:
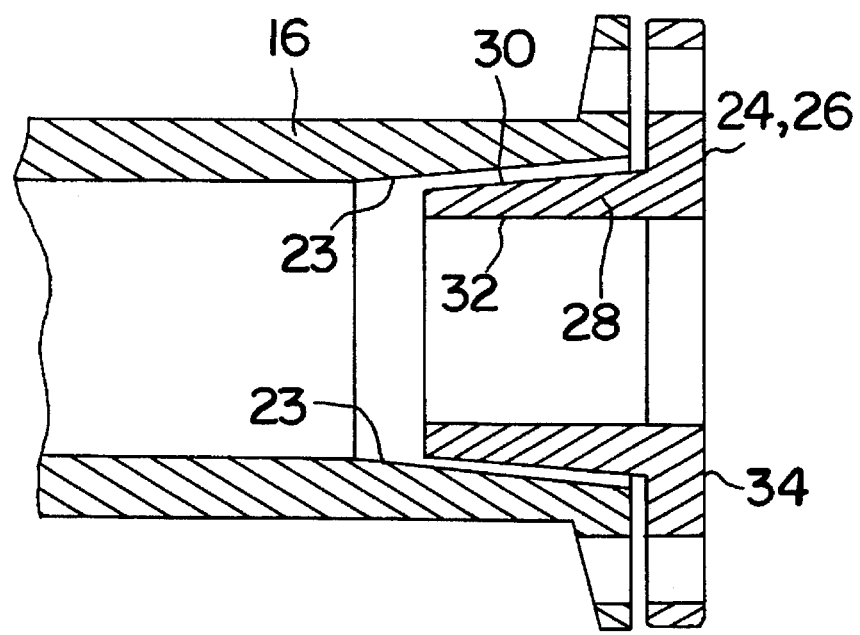
FIG. 3 is a cross-sectional view of a coupling bushing devised in accordance with the invention as used in the reduction device of FIG. 1.
Figure 4:
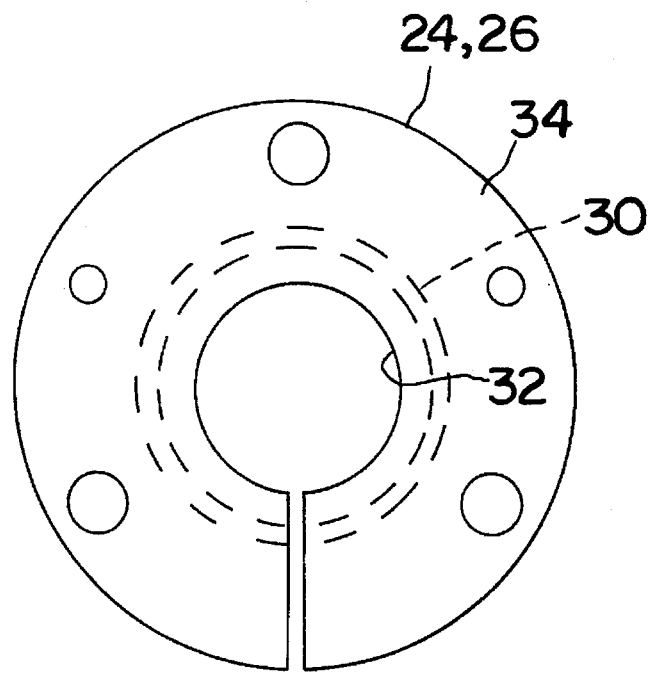
FIG. 4 is an end view of the bushing applied to the output hub for the device.

Output hub 16 is formed with a tapered inner surface 23 at each end and having fitted thereto tapered bushings 24, 26 positioned on both sides of the housing 12, the details of each bushing being illustrated in FIGS. 3 and 4. Each of the bushings includes a cylindrical element or barrel 28 having its outer circumferential surface 30 tapered for mating engagement with the corresponding tapered surface 23 of hub 16. Interior circumferential surface 32 formed on the element or barrel 28 is arranged to receive an output shaft (not shown) useful with the reduction box 10.

Each of the bushings 24, 26 is formed with a flange 34 to which a hub back-up plate 35 may be attached as well as coupling devices (not shown) for connecting the hub 16 to a mechanism to be driven thereby.

The gear reduction box 10 also includes a torque arm assembly generally indicated by the reference numeral 36 having a turnbuckle 38 secured at one end by a fulcrum device 39 to a suitable rigid structure 40 and at its other end to an adapter plate 42 secured to the lower section of the reduction box 12. The assembly 36 maintains the box 10 against rotation during operation, and the turnbuckle provides adjustability as to positioning of the fulcrum 39, and to permit tightening of belts, etc.

The gear box 10 also includes a sealed expansion chamber 44 for permitting the introduction of a lubricant into the box and provide a relief spacer for expansion of lubricants and/or air during the normal operation of the box. The chamber 44 replaces the conventional standard vented breather normally associated with gear boxes. The gear box 10 is the subject matter of a companion application filed concurrently herewith to the same inventors and herein incorporated by reference.

As stated in the foregoing, the gear box 10 and the bushing 24, 26 are arranged to be corrosion resistant and impervious to most environments, in particular, with respect to extremely corrosive environments, such as salt water, fertilizers, concrete, sewage disposal and chemical processes, for preventing premature rusting and deterioration of the internal parts as well as the external parts of the box. In accomplishing this goal, the gear box housing 12 is coated with a protective coating such as epoxy coatings, or polyamides such as nylon, the latter being preferred due to its unique characteristic of being most durable of known materials for this purpose. The coating of the nylon has a thickness approximately 0.008" to 0.020".

Input shaft 14 is coated with a base coat of a fluorocarbon polymer such as a polytetrafluoroethylene polymer, and includes a thermosettable binding material, such as a phenolic binder if the coating is to be applied directly to the metal. The base coating preferably has a thickness of 0.0004 inch to 0.0006 inch and is applied from the end of the shaft and extending into the housing 12 under the adjacent input seals 22. Hub 16 is preferably made from stainless steel which is not coated, but may also be made of steel or iron coated with a base coating of fluorocarbon polymer with a binder material.

Bushings, 24, 26, including the tapered surface 30, the interior surface or bore 32, and the flange 34 are coated with a coating of a fluorocarbon polymer such as polytetrafluoroethylene, and has a binder material as noted above. Similarly, the torque arm assembly and the fulcrum 39 has applied thereto a base coating of the polymer with binding material. A coating of a nylon is applied to the adapter plates 42 to a thickness of 0.008" to 0.020".

In addition to the base coating of a fluorocarbon polymer and thermosettable binder, the coatings applied to the bushings 24, 26, the torque arm assembly 36, the fulcrum 39 may include another layer (or overcoating) of a fluorocarbon polymer which does not include a binder, that is, the polymer in its more pure form to greatly enhance the protective nature of these materials against corrosive environments. Combined coating layers applied to the bushings 24, 26, including the flange 34, the surface 30 and bore surface 28, have a thickness of 0.0015 inch to 0.002 inch.

Historically, when seating a pair of bushings to a hub or the like, only one of the bushings is generally properly seated. When, however, a fluorocarbon polymer coating is applied to the bushing as described herein, the coating is somewhat resilient, and during installation, conforms to the surface characteristic of the receiving structure, e.g., hub and permits improved seating. Likewise, bushings coated according to the present invention will not, so long as the fluorocarbon coating remains in place, ever lock up with its mating structure. Instead, such bushings exhibit extreme ease of disassembly, even if its receiving structure has been uncoated and is severely rusted. Hence, the present invention affords not only protection from the environment, but also provides significant technical advantage to the bushing.

From the foregoing, it will be appreciated that the present invention provides the use of a coupling bushing with industrial equipment for use in extreme environments without causing rusting or deterioration of the internal and exterior parts of the bushing. In accomplishing this goal, coatings are preferably applied to the bushings in thicknesses which will prevent or minimize wear of the applied coating during operation. For example, with a specified coating applied to the tapered surfaces of the bushing, considerably less friction, if any, is present between the surfaces and the hub 16, thereby enabling easy removal of the bushing as noted above. In actual operation, the bushings pop out even against the stainless steel of the hub, or against the base coating of the polymer applied to steel if such coating is utilized. In effect, then, the coatings on the tapered surfaces provide a substantial mechanical advantage as well as to minimize deterioration. The thicknesses of the specified coatings for the different structural elements provide preferred operating conditions which will not only protect the bushing and its structural elements from undue rusting and deterioration, but also to prevent the stripping or wearing of the material comprising the coatings during operation.

While the present invention has been illustrated with respect to a flanged bushing having a tapered outer barrel surface, such is by way of example only. The present invention is likewise applicable to all bushings.

Bushings according to the present invention should be cleaned to remove grease and oil after which the surfaces to receive a fluorocarbon polymer should be roughened as by grit blasting. The roughened surface provides sites for polymer attachment. Thereafter, with the bushing heated to an appropriate metal temperature, e.g., about 400° F. to about 425° F., the fluorocarbon composition may be sprayed thereon to the desired thickness. A preferred base or prime coating is Teflon S, a fluorocarbon composition containing a binder, manufactured by E. I. dupont, Wilmington, Del. In instances where adequate thickness is not achieved, top coating of fluorocarbon polymer without binder materials may be applied directly to the base coating. Upon heating, the fluorocarbon polymer on the outer layer crosslinks with fluorocarbon constituents in a next lower layer for proper coating adherence to the element. Teflon PFA, a fluorocarbon composition manufactured by E. I. dupont, Wilmington, Del., is preferred for top or outer coatings according to the present invention, and may be electrostatically sprayed onto the element. Heating at a temperature of about 725° F. for about 20 minutes will effectuate proper coating adherence though other temperature-time arrangements may also be employed. It has, in fact, been unexpectedly found that bushings coated according to the present invention transmitted adequate torque without keys or splines. While it was anticipated that a significant drop in torque would be experienced, such was not the case. In fact, only very slightly less torque is realized.

While preferred embodiments of the various aspects of the invention have been described using specific terms and arrangements, such descriptions are for illustrative purposes only, and it is to be understood that changes and variations may be made without departing from the scope of the following claims.

What is claimed is:

1. A metallic bushing for coupling a shaft to a gear box wherein said gear box comprises a hub, said bushing having a flange to allow mounting of said bushing to said hub, said bushing having a tapered outer surface, said bushing defining an interior bore therethrough for receiving said shaft, said interior bore and said tapered outer surface having a coating thereon, said coating comprising a fluorocarbon polymer composition and a thermoset binder material, said coating being of sufficient resiliency to prevent lock up of said bushing with said hub and to allow said bushing to transmit adequate torque to couple said shaft with said gear box without the employment of keys or spines when said shaft is received within said interior bore of said bushing.

2. The bushing as defined in claim 1, wherein said fluorocarbon polymer composition comprises a polytetrafluoroethylene polymer.

3. The bushing as defined in claim 1, wherein said coating comprises plural coating layers including an outer layer coating comprising a thermoplastic polytetrafluoroethylene polymer.

4. The bushing as defined in claim 1, wherein said coating has a thickness of from about 0.0015 inch to about 0.002 inch.

5. The bushing as defined in claim 1, wherein said thermoset binder material is a phenolic.

6. The bushing as defined in claim 1, wherein said coating comprises plural coating layers wherein at least one of said coating layers comprises a thermoplastic fluorocarbon polymer.

7. The bushing as defined in claim 1, wherein the entirety of said bushing is coated with said coating.

8. The bushing as defined in claim 1, wherein said coating comprises polytetrafluoroethylene and has a thickness of from about 0.0015 inch to about 0.002 inch.

9. The bushing as defined in claim 8, wherein the entirety of said bushing is coated with said coating.

10. A metallic bushing for coupling a shaft to a gear box wherein said gear box comprises a hub, said bushing having a flange to allow mounting of said bushing to said hub, said bushing having a tapered outer surface and defining an interior bore therethrough for receiving said shaft, said bushing having an opening therealong, said tapered outer surface and said interior bore having a coating thereon, said coating comprising a fluorocarbon polymer composition and a thermoset binder material, said coating being of sufficient resiliency to prevent lock up of said bushing with said hub and to allow said shaft and said interior bore of said bushing to be coupled with sufficient torque to fixedly couple said shaft with said gear box without employment of keys or splines when said shaft is received within said interior bore.

11. The bushing as defined in claim 10, wherein said tapered outer surface has a predetermined length and said opening extends along the entire length of said tapered outer surface.

12. The bushing as defined in claim 10, wherein said coating has a thickness of from about 0.0015 inch to about 0.002 inch.

13. The bushing as defined in claim 10, wherein said fluorocarbon polymer composition comprises polytetrafluoroethylene.

14. The bushing as defined in claim 10, wherein the entirety of said bushing is coated with said coating.

15. The bushing as defined in claim 10, wherein said coating comprises polytetrafluoroethylene and has a thickness of from about 0.0015 inch to about 0.002 inch.

* * * * *